July 20, 1926.

M. S. LOWE 1,593,088

NUT LOCK

Filed June 3, 1926

INVENTOR.
Mak Sing Lowe
BY M. C. Frank
ATTORNEY.

Patented July 20, 1926.

1,593,088

UNITED STATES PATENT OFFICE.

MAK SING LOWE, OF OAKLAND, CALIFORNIA.

NUT LOCK.

Application filed June 3, 1926. Serial No. 113,381.

My invention relates broadly to nut locks, and more particularly to a nut of this character in combination with a bolt having a groove longitudinally formed through the threads thereof.

An important object of the invention is the production of an efficient, inexpensive and simple nut having all the properties of the common standardized nut of the present time, and with the added feature of having as a part thereof a locking member for holding the nut permanently in place when it is screwed to its final position.

Another object is that the locking member is carried by the nuts in such a manner so that when the nut is in the final seating and holding position, the said locking member is not visible and hence it cannot be picked at or tampered with, and furthermore, in the final position the nut has the appearance of the standard nut that is not locked.

A further object is to form recesses from the face side of the nut and on the long diameter thereof for housing the locking member, and so that the sectional area along the long diameter of the nut shall be substantially equal to the area along the short diameter, thus an efficient nut lock is provided having no weakened walls.

A still further object is, in cases where it is desired that the nut shall have the locking features and be removable at times, to provide simple means whereby it may be backed off without injury to itself, the bolt or to the binding surfaces.

The invention possesses other advantageous features, some of which, with the foregoing, will be set forth at length in the following description where I shall outline in full that form of the invention which I have selected for illustration in the drawings accompanying and forming part of the present specification. In said drawings I have shown one form of my invention, but it is to be understood that I do not limit myself to such form, since the invention, as expressed in the claims, may be embodied in a plurality of forms.

Referring to said drawings:

Fig. 3 is a transverse section of the nut and bolt of Fig. 1 along the line 3—3.

Figure 1:
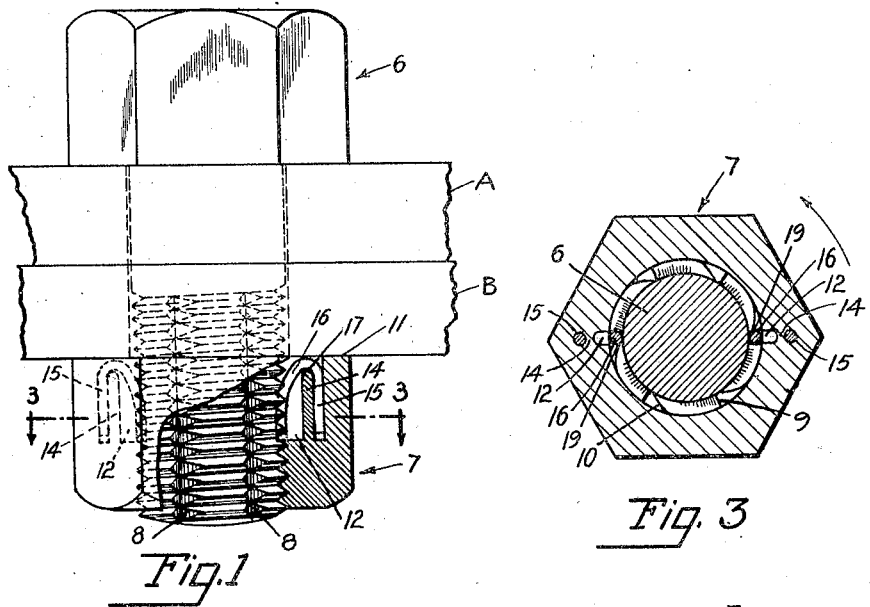
Figure 1 is a side view of a bolt and nut constructed in accordance with my invention. Part of the nut is broken away to show the locking member therein and in locking engagement with the bolt, the bolt and nut clamping two elements together.
Figure 2:
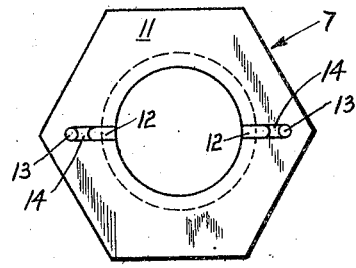
Fig. 2 is a plan of the face side of the nut, the locking members being omitted.

Referring to the drawings in detail: The letters A and B represent two elements of work which are clamped together by means of my invention, and which consists of a bolt 6 and nut 7. The bolt is like any standard bolt, except that longitudinally and through the threads thereof are formed one or more grooves 8, one side of each groove being radial as at 9 and the other side preferably convexedly curved as at 10. The number of grooves on the bolt govern the range of tightness of the nut and surety of locking that may be effected.

The nut, of course, has threads complementary to the bolt, and from the face side 11 of the nut is formed one or more recesses 12 axially and radially with the nut and on the long diameter thereof. The recesses begin at the threaded bore and are of predetermined depth and have a length substantially one-half the length of the nut. Adjacent each recess and in alignment therewith on the long diameter of the nut are axially drilled holes 13 of a diameter substantially that of the width of the recesses. The thin wall 14 between the recess 12 and hole 13 is recessed from the face side of the nut to a predetermined depth of slightly more than the diameter of the hole 13 to permit the hereinafter described locking means to seat below said face side 11.

The locking means for the bolt and nut assembly consists of one or more U-shaped hairpin structures of preferably spring wire, each having one straight leg 15 and an outwardly bowed or extending leg 16. The length of this locking member is less than that of the hole and the recess 12. The straight leg is adapted to snugly fit within the hole 13, while the other leg 16 is adapted to be housed and easily bend within the recess 12.

Figure 4:
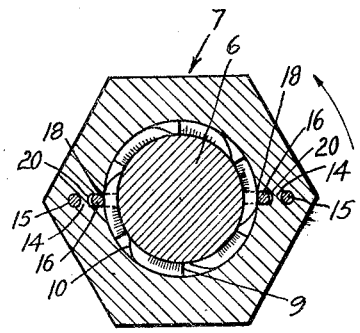
Fig. 4 is a similar section showing the nut turned on the bolt and the locking members not engaged in the grooves of the bolt.

In operation, the nut carrying the locking member which is seated so that its inner underside usually contacts the edge 17 of the thin wall 14, is turned in the usual way and the bowed leg 16 will alternately ride on the top of the threads as shown at 18 Fig. 4 and then on reaching a groove, by reason of the resiliency of the material of the locking member, drop into the said groove as shown at 19 Fig. 3, until the final holding and locking position is reached as illustrated in Fig. 1, where it is to be observed that the leg 16 has snapped into one of the grooves on the bolt. The locking member has clearance at its extremities, and also along the wall 14 as at 20 Fig. 4 to accommodate, in non-binding relation, the leg 16 as it rides over the top of the threads on the bolt.

On very small nuts, one locking member in the nut is sufficient, but on larger nuts at least two may be deemed advisable.

Figure 5:
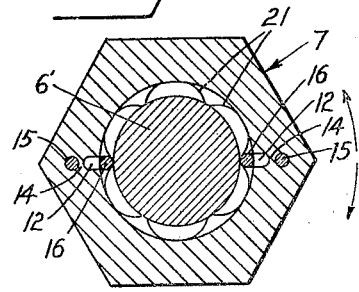
Fig. 5 is likewise a similar section showing an arrangement of the invention whereby the nut may be turned in either direction to lock and unlock it upon the bolt.

In the nut lock structure shown in Fig. 5, the bolt 6' has longitudinal grooves of V-formation, the sides 21 of which being uniform and preferably convexedly curved so that the nut 7 may be turned to final seating, holding and locking position, and when its removal is desired, may be turned in the reverse direction without injury to itself, the bolt or the work.

Having thus illustrated and described my invention, I claim as new and desire patent protection thereon in the United States, the following:—

1. In combination with a bolt provided with a longitudinal groove through its threads, of a nut provided with an axial recess in its threaded bore and adjacent to the recess with an axial hole, a U-shaped locking member for the nut of spring wire having one leg thereof straight and the other outwardly extending, the recess being of a predetermined depth, the straight leg of the member adapted to snugly fit within the hole and the outwardly extending leg to be housed within the recess, whereby when the nut is turned in one direction the latter leg will be forced in its recess and to ride over the threads of the bolt and to spring outwardly into the groove when it meets the latter, the said recess and adjacent hole being formed from the face side of the nut so that the locking member is not visible when the nut is in final seating, holding and locking position.

2. The combination with a bolt provided with a plurality of longitudinal grooves through its threads, of a nut structure as set forth in claim 1.

3. The combination with a bolt provided with a longitudinal groove through its threads, of a nut structure as set forth in claim 1 and in which the said structure is provided with at least two of said U-shaped locking members.

4. The combination with a bolt provided with a plurality of longitudinal grooves through its threads, of a nut structure as set forth in claim 1 and in which the said structure is provided with at least two of said U-shaped locking members.

5. A bolt and nut structure as set forth in claim 1, and in which the longitudinal groove of the bolt is V-shaped, the sides of the groove being uniform to permit the nut of the structure to be turned in either direction so that the locking member therein may be engaged in the groove or disengaged therefrom.

In testimony whereof, I affix my signature.

MAK SING LOWE.